(12) United States Patent
Chou

(10) Patent No.: US 7,969,668 B2
(45) Date of Patent: Jun. 28, 2011

(54) LENS ARRANGEMENT AND LENS MODULE USING SAME

(75) Inventor: Yuan-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/764,903

(22) Filed: Apr. 21, 2010

(65) Prior Publication Data

US 2011/0090582 A1    Apr. 21, 2011

(30) Foreign Application Priority Data

Oct. 21, 2009   (CN) .......................... 2009 1 0308569

(51) Int. Cl.
    *G02B 7/02*    (2006.01)
(52) U.S. Cl. ........ 359/819; 359/811; 359/823; 359/820; 359/827; 359/830; 396/529

(58) Field of Classification Search .................. 359/811, 359/819, 820, 823, 825, 827–829, 892, 422, 359/428, 611, 627, 637; 396/505, 529, 534
See application file for complete search history.

(56) References Cited

U.S. PATENT DOCUMENTS

| | | | | |
|---|---|---|---|---|
| 2,794,360 A | * | 6/1957 | Eagle ............................. | 359/611 |
| 6,072,634 A | * | 6/2000 | Broome et al. ................ | 359/637 |
| 7,738,196 B2 | * | 6/2010 | Seki .............................. | 359/820 |

* cited by examiner

*Primary Examiner* — Loha Ben
(74) *Attorney, Agent, or Firm* — Zhigang Ma

(57) ABSTRACT

A lens arrangement includes two lenses. Each lens includes an optical portion having an optical axis, a non-optical portion surrounding the optical portion, and an engagement portion extending along the optical axis from the non-optical portion. One of the engagement portions includes an outer wall and an inner wall parallel to the outer wall with an annular groove defined therebetween, while the other engagement portion defines a corresponding annular space for receiving the outer wall and the inner wall therein, therefore the engagement portions are interferentially engaged with each other.

7 Claims, 5 Drawing Sheets

LENS ARRANGEMENT AND LENS MODULE USING SAME

BACKGROUND

1. Technical Field

This present disclosure relates to lenses and, particularly, to a lens arrangement and a lens module using the lens arrangement.

2. Description of Related Art

Lens modules typically include a lens barrel and a plurality of lenses received within the lens barrel. At present, the lenses can be separately held by the lens barrel directly, or can be engaged with each other to form a lens arrangement and then held by the lens barrel. Both of these arrangements have alignment problems, which has an impact on imaging quality.

Therefore, it is desirable to provide a lens arrangement and a lens module using the lens arrangement, which can overcome the above-mentioned limitations.

DETAILED DESCRIPTION

Figure 1:
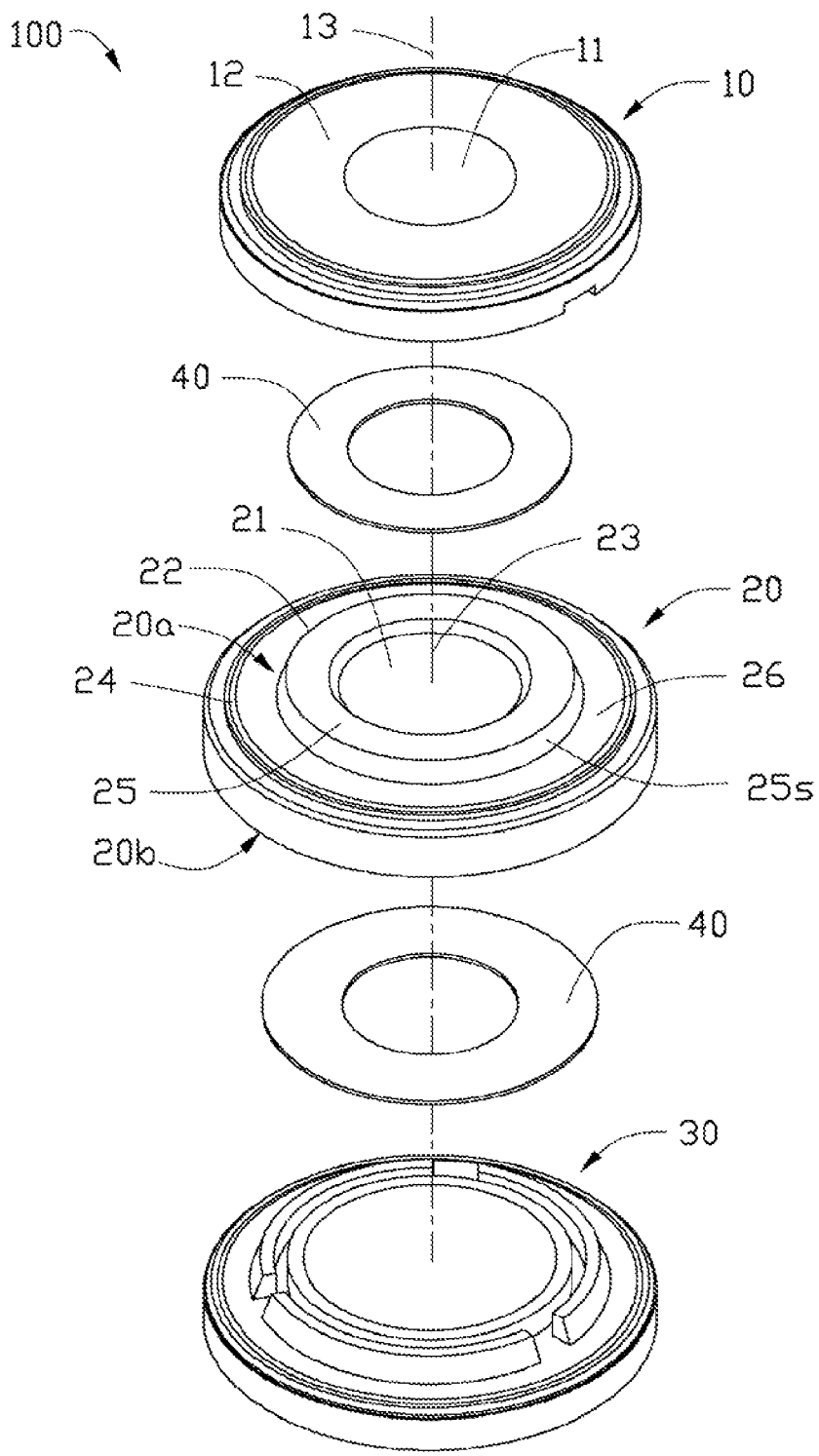
FIG. 1 is an isometric, exploded view of a lens arrangement, according to an exemplary embodiment.
Figure 2:
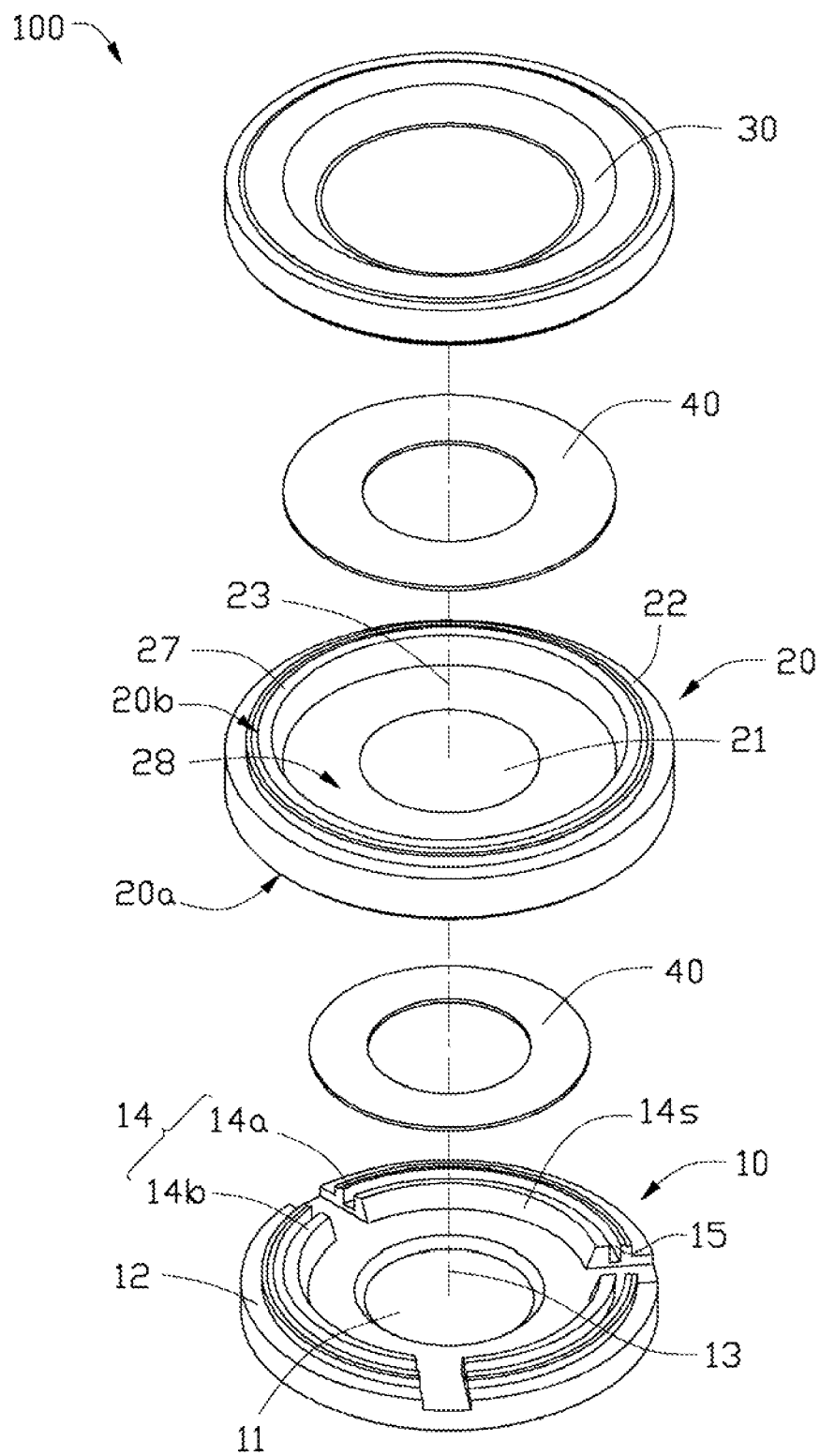
FIG. 2 is similar to FIG. 1, but showing another view of the lens arrangement of FIG. 1.

Referring to FIGS. 1-2, a lens arrangement 100, according to an exemplary embodiment, includes a first lens 10, a second lens 20 and a third lens 30.

The first lens 10, the second lens 20, and the third lens 30 can be plastic or glass lenses. In this embodiment, the first lens 10, the second lens 20, and the third lens 30 are plastic lenses.

The first lens 10 includes a first non-optical portion 12 surrounding a first optical portion 11. The first optical portion 11 is configured for refracting incident light rays and forming corresponding optical images, and defines a first optical axis 13. The first non-optical portion 12 is configured for engaging with the second lens 20. The first lens 10 further includes a first engagement portion 14 protruding from the first non-optical portion 12 along and symmetrical about the first optical axis 13. The first engagement portion 14 is substantially annular. The first engagement portion 14 includes an inner circumferential engagement surface 14s inclining substantially radially outwards from the first non-optical portion 12.

The first engagement portion 14 includes an outer wall 14a and an inner wall 14b substantially parallel to the outer wall 14a. In the present disclosure, the outer wall 14a and the inner wall 14b discontinuously extend along a circumferential direction of the non-optical portion 12. It is noteworthy that the outer wall 14a and the inner wall 14b can be configured to continuously extend along the circumferential direction of the non-optical portion 12 in an alternative embodiment. An annular groove 15 is defined between the inner wall 14b and the outer wall 14a, configured for flexing the outer wall 14a relative to the inner wall 14b.

The second lens 20 includes a second non-optical portion 22 surrounding a second optical portion 21. The second optical portion 21 is configured for refracting incident light rays and forming corresponding optical images, and defines a second optical axis 23. The second non-optical portion 22 is configured for engaging with the first lens 10 and the third lens 30.

The second lens 20 includes a first surface 20a facing the first lens 10 and a second surface 20b opposite to the first surface 20a.

The first surface 20a has an extended first flange 24 and a second engagement portion 25 protruding from the second non-optical portion 22 along and symmetrical about the second optical axis 23. The first flange 24 and the second engagement portion 25 both are substantially annular and parallel to each other. The second engagement portion 25 includes an outer circumferential engagement surface 25s corresponding to the inner circumferential engagement surface 14s. The diameter of the outer circumferential engagement surface 25s is equal to or slightly less than that of the inner circumferential engagement surface 14s. Therefore, the first lens 10 and the second lens 20 can be tightly engaged with each other via friction between the inner circumferential engagement surface 14s and the outer circumferential engagement surface 25s. An annular space 26 is defined between the first flange 24 and the second engagement portion 25, configured for receiving the first engagement portion 14. The inner diameter of the first flange 24 is substantially equal to or slightly less than the outer diameter of the first engagement portion 14. Therefore, the first lens 10 and the second lens 20 can be engaged with each other more efficiently and sufficiently, while the outer wall 14a of the first engagement portion 14 is slightly pressed by the second engagement portion 25.

In the present disclosure, the second surface 20b has an extended second flange 27 protruding from the second non-optical portion 22 along and symmetrical about the second optical axis 23. The second flange 27 for receiving part of the third lens 30 surrounds a receiving cavity 28.

The third lens 30 has a similar structure with the first lens 10 which can be engaged into the receiving cavity 28 to position the third lens 30 on the second lens 20.

Furthermore, two spacer rings 40 can be correspondingly positioned between each of the two adjacent lenses of the first lens 10, the second lens 20 and of the second lens 20 and the third lens 30, to avoid friction produced therebetween.

Figure 3:
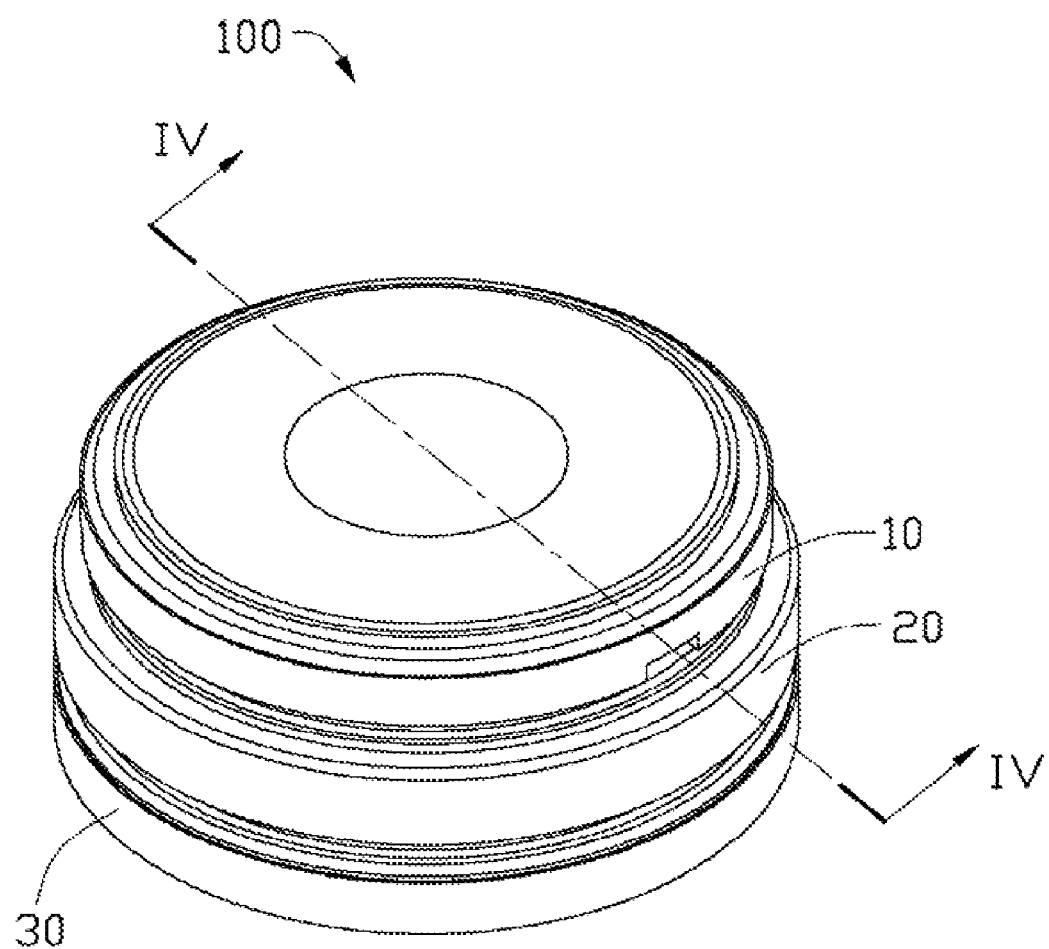
FIG. 3 is an isometric, assembled view of the lens arrangement of FIG. 1.
Figure 4:
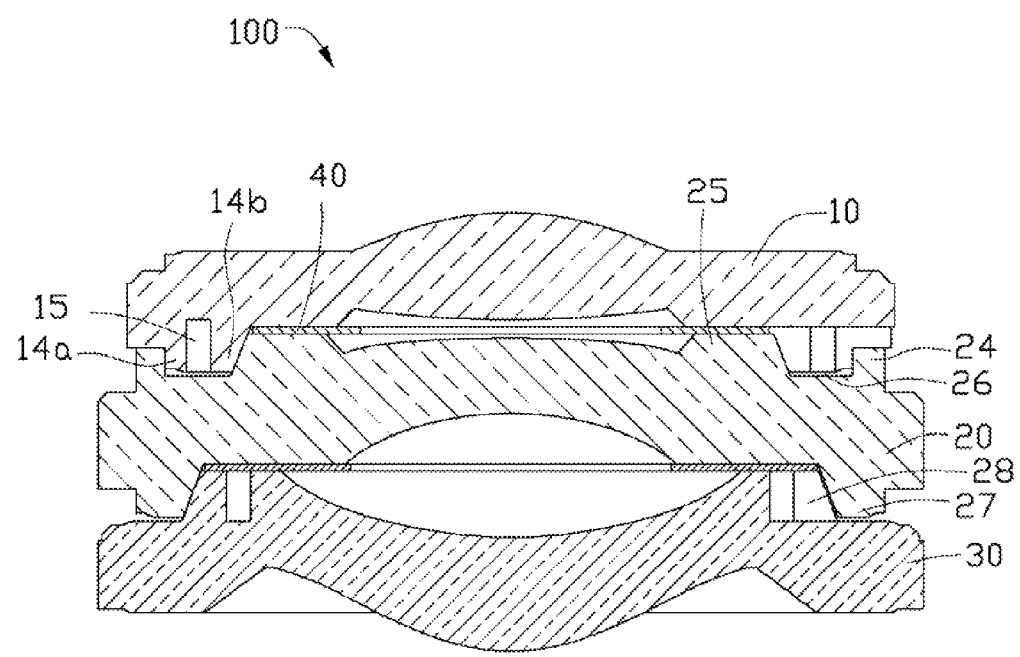
FIG. 4 is a cross-sectional view taken along a line IV-IV of FIG. 3.

Referring to FIGS. 3-4, upon assembly, the first engagement portion 14 is received in the annular space 26 while the inner circumferential engagement surface 14s abuts against the outer circumferential engagement surface 25s. Similarly, part of the third engagement portion 37 is received in the receiving cavity 28. Meanwhile, the first optical axis 13 is superimposed with the second optical axis 23, constituting a common optical axis of the lens arrangement 100. As such, an alignment of the first lens 10 and the second lens 20 is achieved.

Since the outer wall 14a can flex relative to the inner wall 14b, the first engagement portion 14 and the second engagement portion 25 can be efficiently and sufficiently deformed due to an imprecise alignment of the first engagement portion 14 and the second engagement portion 25, without direct deformation caused to the first imaging portion 11 and the second imaging portion 21. Thus, the imaging quality of the lens arrangement 100 is protected from the deformations due to an imprecise alignment of the first engagement portion 14 and the second engagement portion 25.

It should be noteworthy that the lens arrangement 100 can include more than three lenses. Each two adjacent lenses are engaged in such a way similar to that of the first lens 10 and the second lens 20.

Figure 5:
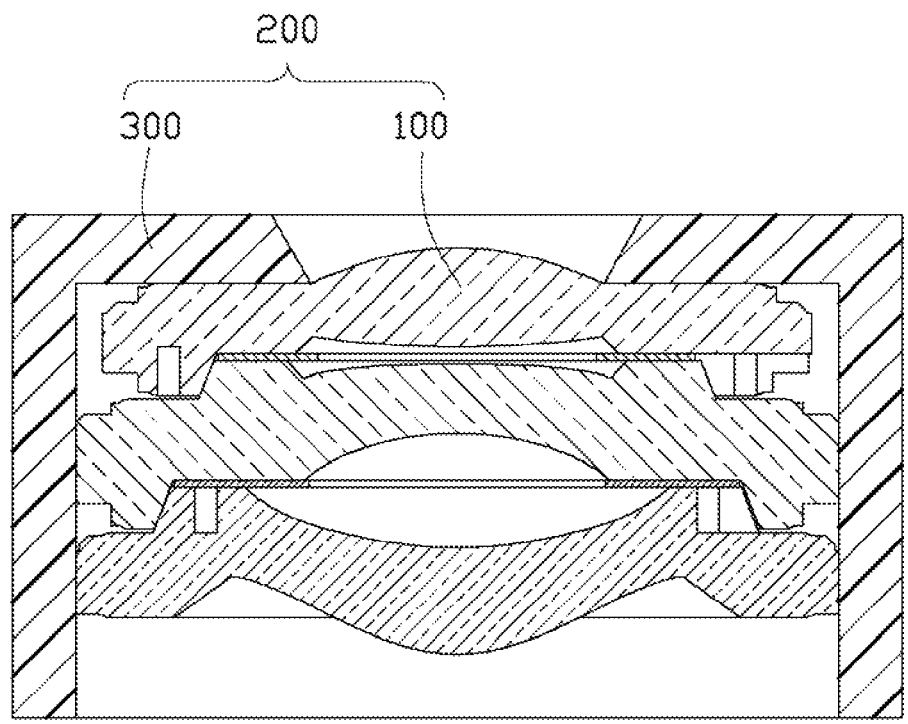
FIG. 5 is a cross-sectional view of a lens module including the lens arrangement of FIG. 1.

Referring to FIG. 5, a lens module 200, according to an exemplary embodiment, includes the lens arrangement 100 and a lens barrel 300. The lens barrel 300 holds the lens arrangement 100.

While various exemplary and preferred embodiments have been described, it is to be understood that the disclosure is not limited thereto. Various modifications and similar arrangements can also be covered as would be apparent to those skilled in the art.

Therefore, the scope of the appended claims should be accorded the broadest interpretation so as to encompass all such modifications and similar arrangements.

What is claimed is:

1. A lens arrangement comprising:
   two lenses, wherein each of which comprises an optical portion having an optical axis, a non-optical portion surrounding the optical portion, and an
   engagement portion extending along the optical axis from the non-optical portion; wherein the engagement portion of one of the lenses comprises an outer wall and an inner wall parallel to the outer wall with an annular groove defined therebetween, while the engagement portion of the other of the lenses defines a corresponding annular space for receiving the outer wall and the inner wall therein, the engagement portions are interferentially engaged with each other.

2. The lens arrangement of claim 1, wherein the lenses are selected from the group consisting of plastic lenses and glass lenses.

3. The lens arrangement of claim 1, wherein the outer wall continuously extends along a circumferential direction of the non-optical portion of one of the lenses.

4. The lens arrangement of claim 1, wherein the outer wall discontinuously extends along a circumferential direction of the non-optical portion of one of the lenses.

5. The lens arrangement of claim 4, wherein the inner wall continuously extends along another circumferential direction of the non-optical portion of one of the lenses.

6. A lens module comprising:
   a lens barrel; and
   a lens arrangement held by the lens barrel, the lens arrangement comprising:
   two lenses, wherein each of which comprises an optical portion having an optical axis, a non-optical portion surrounding the optical portion, and an engagement portion extending along the optical axis from the non-optical portion; wherein the engagement portion of one of the lenses comprises an outer wall and an inner wall parallel to the outer wall with an annular groove defined therebetween, while the engagement portion of the other of the lenses defines a corresponding annular space for receiving the outer wall and the inner wall therein, the engagement portions are interferentially engaged with each other.

7. The lens module of claim 6, further comprising a spacer ring positioned between the two lenses.

* * * * *